(12) United States Patent
Patterson

(10) Patent No.: US 7,472,647 B2
(45) Date of Patent: Jan. 6, 2009

(54) EGG SEPARATORS

(76) Inventor: Claudia M. Patterson, 10526 E. Fernwood La., Scottsdale, AZ (US) 85262

( * ) Notice: Subject to any disclaimer, the term of this patent is extended or adjusted under 35 U.S.C. 154(b) by 0 days.

(21) Appl. No.: 11/646,898

(22) Filed: Dec. 28, 2006

(65) Prior Publication Data
US 2007/0101871 A1 May 10, 2007

(51) Int. Cl.
*A23L 1/00* (2006.01)
(52) U.S. Cl. .......................... 99/499; 99/497
(58) Field of Classification Search .......... 99/495–500, 99/567, 568, 490, 478–480; D7/665, 678
See application file for complete search history.

(56) References Cited

U.S. PATENT DOCUMENTS

| | | | |
|---|---|---|---|
| 1,492,385 A | 4/1924 | Moritz | |
| 2,035,065 A * | 3/1936 | Gray | 99/499 |
| 2,212,328 A | 8/1940 | Scurlock | |
| 2,430,156 A * | 11/1947 | Byers | 99/499 |
| 3,857,327 A * | 12/1974 | Popeil | 99/499 |
| 4,463,666 A | 8/1984 | Papp | |
| D307,527 S | 5/1990 | DeCoster | |
| 5,438,919 A | 8/1995 | Idowu | |
| 6,095,038 A | 8/2000 | Cerro | |
| 6,303,915 B1 | 10/2001 | Young et al. | |
| 6,915,735 B1 | 7/2005 | So | |

* cited by examiner

*Primary Examiner*—Timothy F. Simone
(74) *Attorney, Agent, or Firm*—Robert L. McKellar; McKellar IP Law, PLLC

(57) ABSTRACT

Egg separators having an upper elongated slit to prevent the yolk of an egg from entering a collection device for egg whites. The device provides for a method that will allow multiple separations of egg whites from egg yolks upon cracking individual eggs. The presence of an upper elongated slit in the concave compartments of the device allows the egg white of the eggs to separate from the egg yolks without the egg yolk entering a collection device and/or mixing, merging or flowing into the collected egg whites.

50 Claims, 2 Drawing Sheets

EGG SEPARATORS

This application claims priority from U.S. Utility application No. 11/255,465 filed Oct. 21, 2005.

The invention disclosed and claimed herein deals with egg separators having an upper elongated slit or slits to prevent the yolk of eggs from entering a collection vessel or bowl receiving the separated whites of eggs.

The essence of the invention is to provide such devices that will, upon the manual cracking of individual eggs, allow the separation of multiple egg whites from multiple egg yolks instead of individually separating the yolk and white of only a single egg. The precise and extremely significant location of the upper elongated slits in the concave yolk retention cups of the devices are the method by which the egg whites separate from the egg yolks without the egg yolks entering the collection vessel or bowl.

BACKGROUND OF THE INVENTION

Devices that are used to separate egg yolks from egg whites are well known and usually operate by having a receptacle for retaining the yolk and apertures of varying design for straining the egg white from the yolk. They are usually available in the form of a handheld implement. Several of those known in the art have a dual functionality such as lemon squeezers and the like.

On such device can be found in U.S. Pat. No. 1,492,385, issued Apr. 29, 1924 to Moritz. The device is a cup that has a handle and has located in its center/bottom, separators for squeezing lemons. The separator has an opening in the dead center of the cup to pass the egg whites through into a receiver bowl.

A similar device can be found in U.S. Pat. No. 2,212,328, Issued Aug. 20, 1940 to Scurlock.

There is disclosed in U.S. Pat. No. 4,463,666, that issued Aug. 7, 1984 to Papp an egg separator that has a receptacle with a bottom wall that slopes toward the center where there is a tubular hollow upright provided with circumferentially spaced vertical openings leading to a center discharge hole for the egg whites, the yolks being held back at the openings. It does not specifically identify what sort of device prevents the yolk from descending into the receiver.

A similar device can be found in U.S. Pat. No. 5,438,919, that issued on Aug. 8, 1995 to Idowu. The device is rather complicated and it consists of a housing having an inner chamber and an outer chamber. It has a lid member detachably coupled to an upper edge of the housing. The lid includes an annular member positioned above the inner chamber and a plurality of slots disposed adjacent to the annular member communicating with the outer chamber. Ther is also a funnel attached to the lid. The annular member is sized for retaining the yolk and for causing the egg white to overflow the annular member with the slots allowing the egg white to flow downwardly into the outer chamber. A means is also provided for channeling the separated yolk into the opposite chamber.

There is disclosed in U.S. Pat. No. 6,303,915 that issued on Oct. 16, 2001 to Young et al, a device for separating and cooking egg whites. A heat resistant bowl includes a bottom portion and a wall portion, a lid for removably engaging the wall portion of the bowl in a snug fit, and a separator for separating liquid egg whites from eggs, the separator being connected to the lid whereupon the egg whites are cooked in the bowl by subjecting the bowl to microwaves.

U.S. Design Pat. No. 307,527 discloses an egg separator that is a small pan with elongated slits in the bottom.

U.S. Pat. No. 6,095,038 that issued on Aug. 1, 2000 to Cerro deals with an egg white and yolk separator that has multiple concavities that have elongated slits in the bottom of the concavities.

U.S. Pat. No. 6,915,735 that issued on Jul. 12, 2005 to So, deals with an egg yolk separator that includes a strainer having a portion for retaining an egg yolk and aperture for straining egg white. A pair of arms extends in opposite directions from the strainer for resting on opposite sides of an opening of a vessel. One of the arms is extendable and retractable in length such that overall length of the separator is adjustable to suit the width of the opening of the vessel. The strainer has elongated lateral slits near the middle of the strainer for allowing egg whites to sift through, however, this device also has a centrally located aperture in the bottom of the strainer.

SUMMARY OF THE INVENTION

Thus, this invention comprises an egg separator. The separator comprises essentially a flat plate and the flat plate has a planar surface and a tray formed in it. The tray has a plurality of spaced-apart concave compartments therein to receive whole egg components consisting of at least a yolk and an egg white. The concave compartments have an upper edge and each of the concave compartments has at least two slits therethrough located near the upper edge of the concave compartment. The slits are essentially parallel to the planar surface of the flat plate.

THE INVENTION

Figure 1:
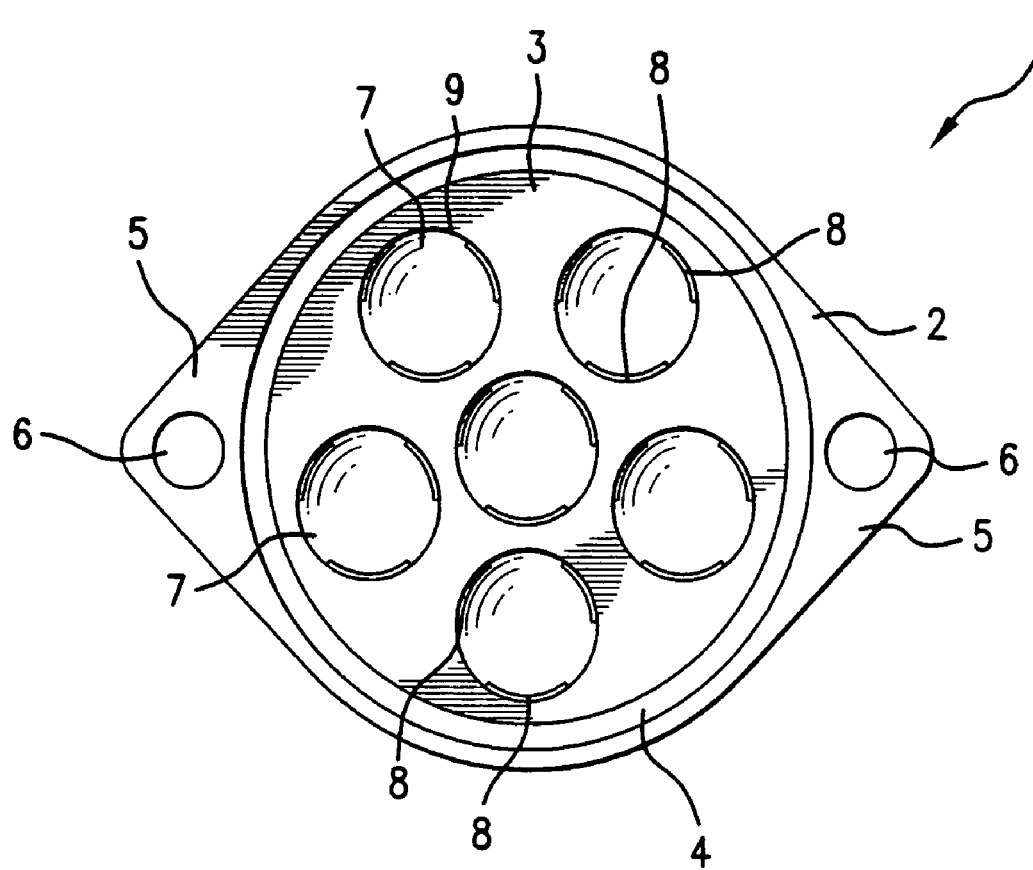
FIG. 1 is a full top view of a device of this invention.

FIG. 1 is a full top view of a device 1 of this invention. Shown in the FIG. 1 is a flat plate 2, containing therein a tray configuration 3, whose sidewall is shown at 4. In this FIG. 1, there is also shown two handles 5 that are also flat, and have the same plane as the top of the flat plate 2, and the handles 5 are unitarily connected to the flat plate 2. Shown at the tip ends of the handles 5 are openings 6 that can be used to store the device 1 by hanging on a hook or some such device.

Figure 2:
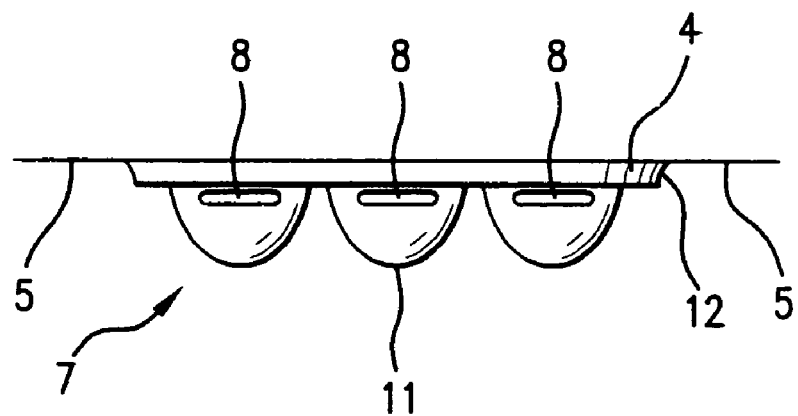
FIG. 2 is a full side view of a device of FIG. 1.

As indicated above, the flat plate 2 has a tray configuration 3 in the center thereof, and as shown in FIG. 2, which is a full side view of the device 1. The wall 4 of the tray configuration 3 is sloping. The circumference of the outside surface 12 of the wall 4 is on the order of about 0.20 to about 0.28 inches, and the depth of the tray configuration 3 is on the order of about 0.20 to about 0.28 inches.

Nominally, the overall size of the flat plate 2 is on the order of about seven to ten inches, and depending on the type of material that the device is manufactured from, the flat plate 2 is about 0.0065 to 0.0085 inches in thickness. Metal flat plates tend to be thicker, on the order of about 0.0075 to 0.0085 inches, and plastic flat plates tend to be thinner, that is, about 0.0065 to about 0.0075 inches, but this invention is not so limited.

Shown for illustration purposes is a device 1 having five concave compartments 7, although, it is contemplated within the scope of this invention to have at least one such compartment 7 and as many as twenty-four such compartments 7.

The compartments 7 consist of concave cups having a smooth continuous outside curve 11 without any openings in the curve 11 per se. The size of these concave cups 7 is nominally about 1¼ to 2½ inches across, and about 0.50 to about 1.25 inches deep, the preferred size being about 1.6875 inches. The preferred depth of the concave cup 7 is about 0.5 to about 1.25 inches, and most preferred is about 0.8750 inches.

Precisely and significantly located in each concave cup 7 is at least one linear, elongated slit 8 that is essentially parallel to the planar surface of the flat plate 2. Each slit 8 is about 0.25 to 1.50 inches long, the preferred length being abut 1.00 inch. Each elongated slit 8 is about 0.0.0625 inches to about 0.375 inches high from its opening at its top edge to its bottom edge, with the preferred opening height being about 1.125 inches. Each elongated slit 8 is located about 0.03125 inches to about 0.75 inches below the upper edge 9 of the concave yolk retention cup 7 with the preferred location being about 0.125 inches below the upper edge 9. Preferred for this invention is a concave cup 7 having at least one such slit 8, and most preferred are concave cups 7 having at least three such slits.

The location of each slit 8 is extremely significant and critical to this invention. When individual eggs are cracked and dropped into the concave cup 7, the yolks can break slightly. In all of the prior art devices, there are apertures in the bottoms of the cups which would allow any slightly broken egg yolks to merge, mix or flow into the egg whites both before and/or after the separated egg whites reached the collection container thereby spoiling the collection of separated egg whites. In the device of the instant invention, there is little possibility of any egg yolk merging, mixing or flowing into the separated egg whites. This is due to the fact that the egg yolks are denser than the egg whites, and they go immediately to the bottom of the concave yolk retention cups 7, even though they may be slightly broken during the cracking of the whole egg. Since there are no apertures or elongate slits in the center bottoms, lower halves or bottoms of the concave yolk retention cups 7 of the instant invention, the egg yolks, broken or unbroken, cannot merge, mix with or flow into the separated egg whites contained in the receiver 13.

Figure 3:
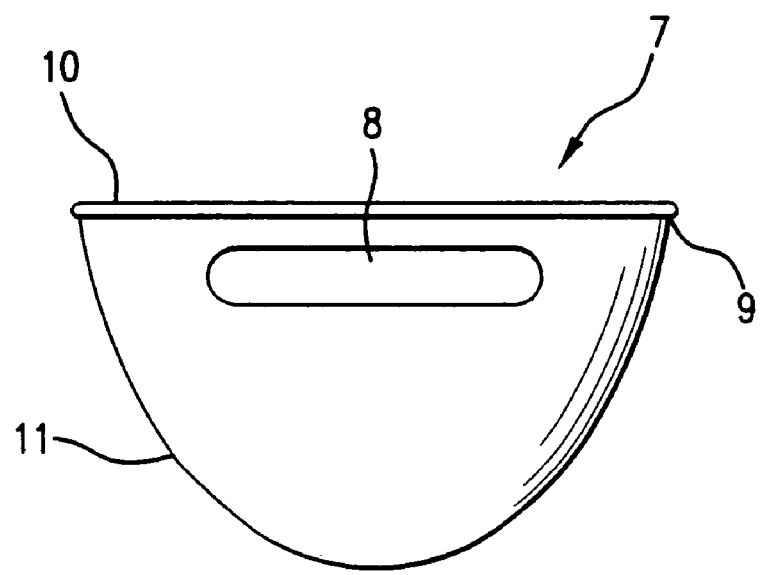
FIG. 3 is an enlarged view of a concave compartment of this invention.

In the Figures, the device 1 of this invention has been illustrated as having the concave cups 7 formed as one integral unit with the tray configuration 3. It is contemplated within the scope of this invention to use separate concave compartments 7 that can be separated from the tray configuration 3. One such concave compartment 7 is shown in FIG. 3, wherein in addition to the continuous curve 11, and the slits 8, there is shown a small lip 10 on the edge of the concave compartment 7 that serves to keep the concave compartment 7 in the tray configuration 4 of the flat plate 2, without the concave compartment 7 falling into the receiver 13. When the concave yolk retention cups 7 are made to be removable, this small lip 10 serves to keep each concave yolk retention cup 7 nestled securely in the tray configuration 3 of the flat plate 2, or nestled securely in the flat plate 2 itself, keeping each concave yolk retention cup 7 from falling into the receiver 13.

Figure 4:
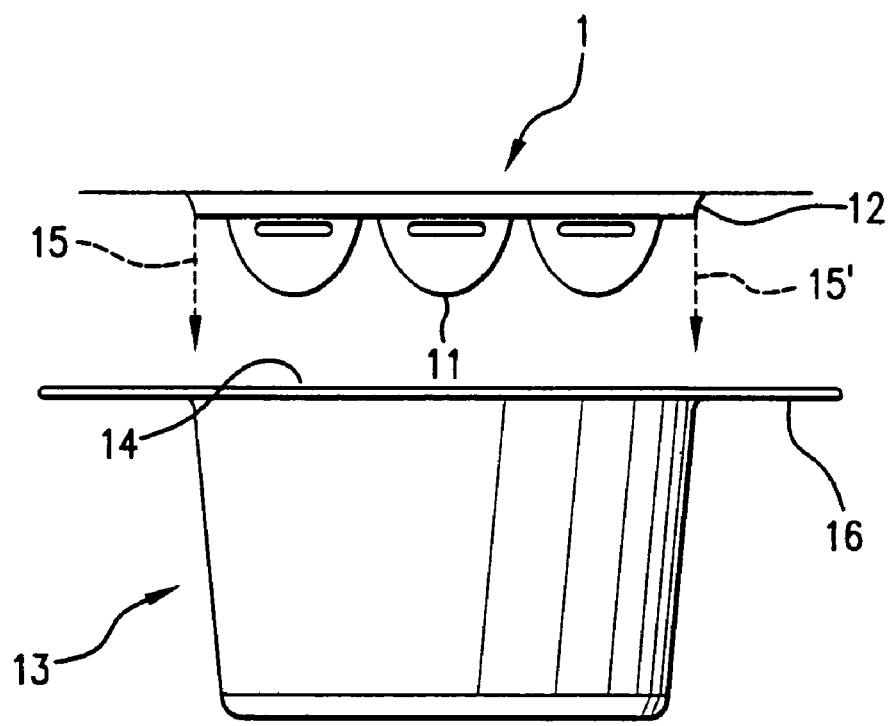
FIG. 4 is a full side view of a combination of a device of this invention and a receiver.

It is also contemplated within the scope of this invention to combine the device 1 of this invention with a receiver and one such receiver 13 is shown in FIG. 4, wherein there is shown a combination of an egg separator 1 of this invention with a receiver 13. As shown, the receiver 13 has a size in diameter nearly equivalent to the top opening 14 in the bowl. The equivalency is shown by dotted lines 15 and 15'. It is additionally contemplated within the scope of this invention that, if the concave yolk retention cups 7 are formed integrally with the flat plate 2, the top opening 14 of the receiver 13 can be enlarged or reduced by about 0.03125 inches to about 2.5 inches in order to suit the circumferential shape of the flat plate 2.

In use, the egg separator 1 of this invention sits on the receiver 13 such that the tray configuration 4 fits inside the diameter of the top opening 14, and the handles 5 of the flat plate 2 rest on the top 16 of the receiver 13.

The device 1 of this invention can be manufactured out of any convenient material that will withstand dishwashing temperature, detergents and the like. For example, the device 1 of this invention can be manufactured from metals such as steel, stainless steel, polished stainless steel, brushed stainless steel, aluminum, brushed aluminum, copper, polished copper, coated metals, clad metals, cast iron and the like. It can also be manufactured from plastics, such as polyethylene, polypropylene, crosslinked polyethylene, nylon, styrene, and polycarbonate, Lucite®, Bakelite®, silicone rubbers, and the like. It can also be manufactured from glass, ceramic, clay, pottery, wood and the like.

Preferred is steel, especially stainless steel and polished stainless steel.

What is claimed is;

1. A multiple egg separator, said separator comprising a flat plate, said flat plate having a planar surface and said flat plate having a plurality of spaced-apart concave compartments therein to receive whole egg components consisting of at least one yolk and one egg white; said concave compartments having an upper edge wherein each of said concave compartments has at least one slit therethrough located about 0.03125 inches to about 0.75 inches below the upper edge thereof, said slit being parallel to the planar surface of the flat plate.

2. An egg separator as claimed in claim 1 wherein in addition, there is a tray configuration contained in the flat plate and the concave compartments are contained in the tray configuration.

3. The egg separator as claimed in claim 1 wherein each of the concave compartments has a plurality of elongated slits therethrough located about 0.03125 inches to about 0.75 inches below the upper edge thereof.

4. The egg separator as claimed in claim 3 wherein there are three elongated slits.

5. The egg separator as claimed in claim 3 wherein there are five elongated slits.

6. The egg separator as claimed in claim 1 wherein the concave compartments are integrally formed within the tray configuration.

7. The egg separator as claimed in claim 1 wherein the concave compartments are integrally formed within the flat plate.

8. The egg separator as claimed in claim 2 wherein the concave compartments are separable from the tray configuration.

9. The egg separator as claimed in claim 1 wherein the concave compartments are separable from the flat plate.

10. The egg separator as claimed in claim 1 wherein the flat plate has at least one handle attached thereto.

11. The egg separator as claimed in claim 10 wherein the handle is flat in the same plane as the flat plate.

12. The egg separator as claimed in claim 10 wherein there is an opening in the handle.

13. The egg separator as claimed in claim 1 wherein the flat plate has a rim.

14. The egg separator as claimed in claim 2 wherein the tray configuration has a rim.

15. In combination, the egg separator as claimed in claim 1 and a receiver for egg whites.

16. In combination, the egg separator as claimed in claim 2 and a receiver for egg whites.

17. The combination of claim 15 wherein the receiver is a bowl.

18. The combination of claim 16 wherein the receiver is a bowl.

19. The combination of claim 18 wherein the receiver has an open top, and the open top matches the circumference of the sidewall of the tray.

20. The combination of claim 15 wherein the receiver has an open top, and the open top matches the circumference of the flat plate.

21. The egg separator as claimed in claim 1 manufactured from plastic.

22. The egg separator as claimed in claim 21 wherein the plastic is polypropylene.

23. The egg separator as claimed in claim 21 wherein the plastic is polyethylene.

24. The egg separator as claimed in claim 21 wherein the plastic is cross linked polyethylene.

25. The egg separator as claimed in claim 21 wherein the plastic is polystyrene.

26. The egg separator as claimed in claim 21 wherein the plastic is polyacrylic resins.

27. The egg separator as claimed in claim 21 wherein the plastic is epoxy.

28. The egg separator as claimed in claim 21 wherein the plastic is phenolic resins.

29. The egg separator as claimed in claim 21 wherein the plastic is polysulfone.

30. The egg separator as claimed in claim 21 wherein the plastic is a phenoxy resin.

31. The egg separator as claimed in claim 21 wherein the plastic is an ethylene copolymer.

32. The egg separator as claimed in claim 21 wherein the plastic is ABS.

33. The egg separator as claimed in claim 21 wherein the plastic is perylene.

34. The egg separator as claimed in claim 21 wherein the plastic is a vinyl resin.

35. The egg separator as claimed in claim 1 manufactured from metal.

36. The egg separator as claimed in claim 35 wherein the metal is aluminum.

37. The egg separator as claimed in claim 35 wherein the metal is stainless steel.

38. The egg separator as claimed in claim 35 wherein the stainless steel is polished stainless steel.

39. The egg separator as claimed in claim 35 wherein the metal is brushed stainless steel.

40. The egg separator as claimed in claim 35 wherein the metal is brushed aluminum.

41. The egg separator as claimed in claim 35 wherein the metal is copper.

42. The egg separator as claimed in claim 35 wherein the metal is polished copper.

43. The egg separator as claimed in claim 35 wherein the metal is cast iron.

44. The egg separator as claimed in claim 35 wherein the metal is coated metal.

45. The egg separator as claimed in claim 35 wherein the metal is clad metal.

46. The egg separator as claimed in claim 1 manufactured from glass.

47. The egg separator as claimed in claim 1 manufactured from ceramic.

48. The egg separator as claimed in claim 1 manufactured from clay.

49. The egg separator as claimed in claim 1 manufactured from pottery.

50. The egg separator as claimed in claim 1 manufactured from wood.

\* \* \* \* \*